United States Patent
Chou et al.

(10) Patent No.: US 8,120,678 B2
(45) Date of Patent: Feb. 21, 2012

(54) METHOD FOR ELIMINATING IMAGE NOISE AND APPARATUS USING THE METHOD

(75) Inventors: Chan-Min Chou, Banqiao (TW); Cong-Qi Peng, Hukou Township, Hsinchu County (TW)

(73) Assignee: Altek Corporation, Hsinchu (TW)

( * ) Notice: Subject to any disclaimer, the term of this patent is extended or adjusted under 35 U.S.C. 154(b) by 247 days.

(21) Appl. No.: 12/691,199

(22) Filed: Jan. 21, 2010

(65) Prior Publication Data
US 2011/0019034 A1    Jan. 27, 2011

(30) Foreign Application Priority Data
Jul. 27, 2009  (TW) .............................. 98125245 A

(51) Int. Cl.
*H04N 5/217* (2011.01)
*H04N 9/64* (2006.01)

(52) U.S. Cl. ......... 348/241; 348/243; 348/246; 348/248
(58) Field of Classification Search ........... 348/241–251
See application file for complete search history.

(56) References Cited

U.S. PATENT DOCUMENTS

| | | | |
|---|---|---|---|
| 7,710,483 B2* | 5/2010 | Kato ............................. 348/311 |
| 7,834,917 B2* | 11/2010 | Kinoshita et al. ............. 348/241 |
| 7,889,248 B2* | 2/2011 | Kawashima ................... 348/241 |
| 2004/0196234 A1* | 10/2004 | Shiomi et al. .................. 345/89 |
| 2007/0216785 A1* | 9/2007 | Nomura et al. ................. 348/242 |
| 2008/0100728 A1* | 5/2008 | Nagata ........................... 348/247 |
| 2008/0111901 A1* | 5/2008 | Kawashima ................... 348/241 |
| 2008/0117318 A1* | 5/2008 | Aoki ............................. 348/246 |
| 2009/0167903 A1* | 7/2009 | Sakurai et al. ................ 348/241 |
| 2009/0167907 A1* | 7/2009 | Utsugi ........................... 348/246 |
| 2009/0174797 A1* | 7/2009 | Hu et al. ........................ 348/247 |
| 2009/0231473 A1* | 9/2009 | Shimoozono et al. ......... 348/246 |
| 2009/0245683 A1* | 10/2009 | Sasaki ........................... 382/275 |
| 2009/0310000 A1* | 12/2009 | Hosokawa et al. ............ 348/241 |
| 2010/0053380 A1* | 3/2010 | Ise ................................. 348/241 |
| 2010/0182482 A1* | 7/2010 | Tanaka et al. ............ 348/333.12 |
| 2010/0231758 A1* | 9/2010 | Matsushita et al. ........... 348/242 |
| 2011/0187902 A1* | 8/2011 | Adams et al. ................. 348/241 |
| 2011/0273595 A1* | 11/2011 | Tsuda ........................... 348/241 |

* cited by examiner

*Primary Examiner* — Sinh Tran
*Assistant Examiner* — Selam Gebriel
(74) *Attorney, Agent, or Firm* — Muncy, Geissler, Olds & Lowe, PLLC

(57) ABSTRACT

Provided are method and apparatus for eliminating image noise caused by variation between the imaging pixels on an image sensor. Preferably, a uniform light source is provided firstly, and the image sensor records exposure values taken from the source. Method is to sum the exposure values in each channel of each line, and calculate channel's average of sum for each channel and sum for adjacent lines' channels. A channel compensation value is then obtained by subtracting the average from the sum of one channel in one line, and divided by the pixel number in one channel. A compensation average constituted of a first part and a second part for each pixel is further calculated. A pixel compensation value for each pixel is obtained by suitably allotting the two parts. The pixel compensation value is finally recorded in memory and being a reference for future photographing.

10 Claims, 7 Drawing Sheets

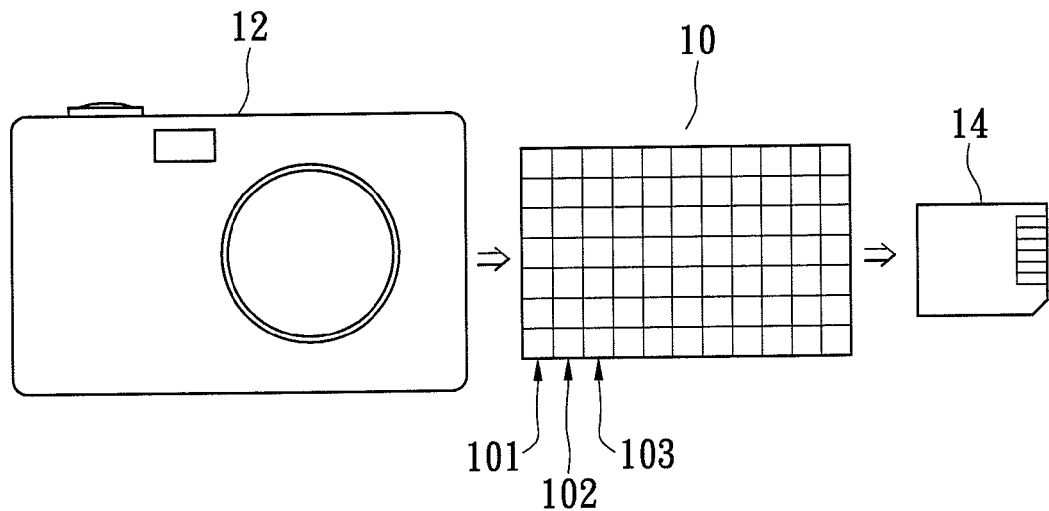
FIG. 1
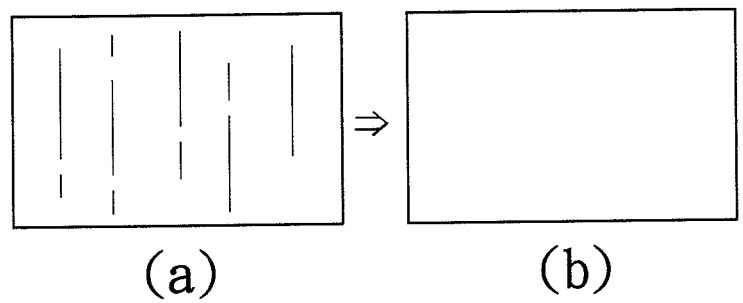
FIG. 2
| $G_R$ | R | $G_R$ | R | $G_R$ |
|---|---|---|---|---|
| B | $G_B$ | B | $G_B$ | B |
| $G_R$ | R | $G_R$ | R | $G_R$ |
| B | $G_B$ | B | $G_B$ | B |
| $G_R$ | R | $G_R$ | R | $G_R$ |
FIG. 3

METHOD FOR ELIMINATING IMAGE NOISE AND APPARATUS USING THE METHOD

BACKGROUND OF THE INVENTION

1. Field of the Invention

The invention is generally related to a method for eliminating image noise and an apparatus using the same, more particularly to introduce an average of partial pixels and an allotment-compensation mechanism to be a basis for compensation, in order to eliminate the image noise as photographing.

2. Description of Related Art

A digital camera generally utilizes lens to capture an image and projects it onto an image sensor, such as CCD, CMOS. Through the image sensor, the image is converted into digital image signals. The digital signals are then stored into a storage medium via some electronic circuitries. A color filter is usually mounted in front side of the image sensor since merely the light intensity can be sensed by the image sensor but not the colors.

According to the conventional technology and its improvement, the mentioned color filter incorporates a color separation concept of the three primary colors (Red, Green, Blue). Generally, three separate image sensors in a conventional art are used to record three separate primary values, and then the values are mixed to form a true-color image. In particular, a single image sensor is also used since it utilizes the color filter to separate the incoming signals into three values of primary colors which are separately recorded by pixels. Each pixel only records one of the grey scales of the primary colors. After that, the pixels can be mixed as a true-color image.

In the mentioned design, one pixel only senses one color at one time and ignores the other two. An interpolation method will be introduced to re-establish the two lost colors.

It is noted that the color filter usually adopts a square-form filtering array, that is Bayer pattern.

The image captured by the digital camera having the image sensor may have noise because of the interference caused by the inside circuits or the defect within the image sensor. For example, the hardware design of the image sensor easily makes difference of the intensity between lines thereon. The difference may cause fixed image noise on the image along vertical direction and directly affect the image's quality. Therefore, when the digital camera is produced, some compensating values will be used for future photographing after the above examination.

In general, it's to take a picture from a uniform light source or an image, and to calculate a difference between each pixel and a line average. The compensation values for the pixels in each line are then obtained by dividing a sum of the pixels by the pixel number.

A magnification factor is calculated in accordance with the gain for G channel as photographing. The compensation value magnified according to the magnification factor will be subtracted for restoring the image after elimination of the fixed image noise.

SUMMARY OF THE INVENTION

In the embodiment of the subject invention, it's to analyze an image sensor by the sum of intensities of pixels in each line under a uniform light source firstly. A difference of the intensities between the lines on the sensor can be obtained. The difference is also one of the reasons causing the noises on the image sensor. After obtaining the difference, the intensities for compensating the pixels in each line can be calculated. It is featured that the fixed image noise can be eliminated by allotting the compensating intensities over the pixels in each line.

One of the objects of the invention is to provide an apparatus for eliminating image noise using the above-described scheme. The compensating intensities for the pixels of the image sensor are calculated under a uniform light source. Since only an average of partial channels are employed, it needs not to magnify the compensation value in progress. The pixel difference of the decimal part of the compensation value is evenly, with corresponding probability, added into the pixels in each line. It's noted that the energy in decimal part of the compensation value can be suitably applied.

The method for eliminating image noise of the subject invention is essentially to solve the image noise which is caused by the pixel differences existed on the image sensor. According to the preferred embodiment, the first step is to take a picture from a uniform light source or image. The pixels of the image sensor are used to record the exposure values line by line. After that, it is to sum up the exposure values of the equivalent channels in each line. Other than the conventional way that is to calculate an average over the whole image sensor, the embodiment of the present invention is to average the exposure values of the pixels in a channel and the values of pixels with equivalent channel in part of the adjacent lines. A channel compensation value is obtained from a difference between the average and the sum of the exposure values of pixels with equivalent channel in each line. By dividing the channel compensation value by the pixel number in each line, a compensation average for each pixel is then obtained.

Particularly, the compensation average includes a first part and a second part. The first part can be an integer part being the primary compensation value for each pixel, and the second part can be decimal part being the secondary compensation value after allotment. The sum of the primary compensation value and the secondary compensation value is recorded into a memory circuit and formed as the pixel compensation value for each pixel. The recorded value is special to be the compensation basis of photographing.

The apparatus applying the mentioned method of eliminating the image noise is disclosed. The apparatus is especially to be a digital camera for photographing and recording the image signal. The apparatus at least has an image capturing unit, an image sensing unit, and a memory unit. The characteristic in that is a compensation memory unit included for recording the pixel compensation value for each pixel for compensating the taken image.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein:

FIG. 1 shows a schematic diagram of data transmission employed in a digital camera;

FIG. 2 shows the schematic image before and after eliminating the noise in the present invention;

FIG. 3 illustrates an example of Bayer Pattern;

DETAILED DESCRIPTION OF THE PREFERRED EMBODIMENTS

Figure 4:
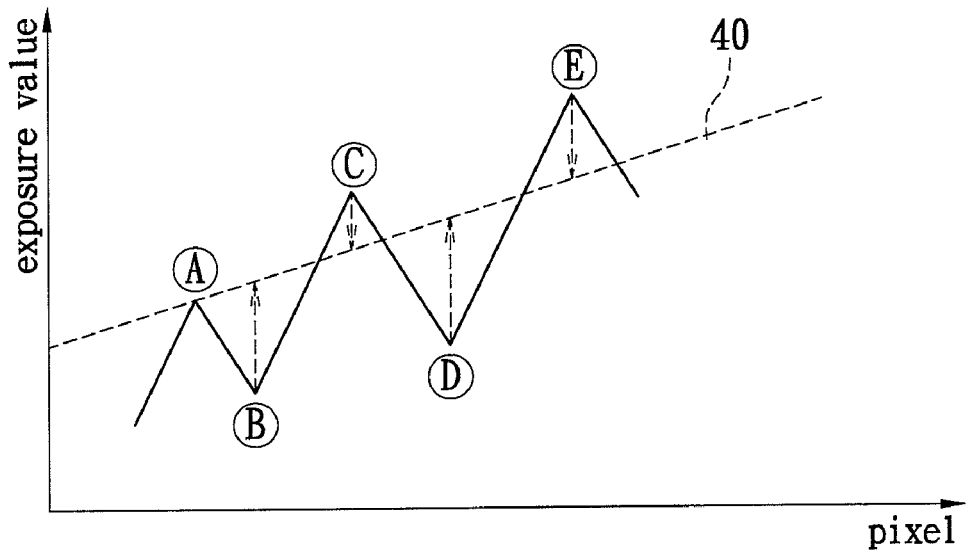
FIG. 4 shows the relationship between the pixel positions in each channel and their exposure values.

When a digital image capturing apparatus works, some image noises may be existed as the inside image sensor converting the captured image into digital signals. The signaling transmission or the defect on the image sensor may result in the image noises. In the progress as formatting the image, the image signals recorded in the pixels in a line have a specific frequency. However, this frequency in each line may have variation related to the frequencies in adjacent lines, and the variation especially induces the noises. In view of the above deficiency, the present invention provides a method for eliminating the relevant image noise. A compensation mechanism is particularly used to break the original signaling frequency in order to eliminate the noise subjected to the frequency variation between lines.

Reference is made to FIG. 1 showing a schematic diagram of data transmission employed in a digital camera. In this example, a camera 12 captures an image. The inside image sensor 10 receives this image and converts the image signals into exposure value for each pixel. The square shown in the image sensor 10 diagrammatically represents the pixels. The pixels shown in the lines 101, 102, 103 are sequentially record the exposure values. Those exposure values are then saved in a memory 14. The mentioned noises in the exemplary example are existed due to the frequency variations between the lines 101, 102, 103.

FIG. 2(*a*) shows the noises appeared on the image. The image sensor converts the image into signals, and the image signals have the shown vertical-line noises. Those noises are the noises existed between the lines on the sensor.

The claimed method for eliminating the image noise uses a compensation mechanism to make up the variation. Especially, compensation values are further allotted for suitably eliminating the concerned difference regarding the noises between the channels or lines. Referring to FIG. 2(*b*), where the difference between the pixel channels in each line has been compensated, and no image noise is shown.

Since the pixels on the image sensor merely sense the image's brightness (or light's intensity) rather than the colors, the image sensor often incorporates a Bayer Pattern shown in FIG. 3 or other like color filters in a color image processing procedure. The color filters are used to divide the image into three primary colors R, G and B. The information related to the three colors is separately received by different adjacent pixels. After that, an interpolation operation is used to fill up the lost colors, and the three colors are mixed to form the original true-color image.

Particularly, in consideration of the green is more irritable to human eyes, two times of green are introduced into the color filter. The green pixel is $G_R$ or $G_B$ due to the position of adjacent color next to the green pixel, in which the $G_R$ means the adjacent pixels are for read, and the $G_B$ is because its adjacent pixels are for blue.

The subject invention preferably utilizes a color filter to divide the pixels on the image sensor into four categories, and they are R, $G_R$, $G_B$, B. More particularly to the present invention, the pixels with the same category are formed as a channel. The channel can be R channel, $G_R$ channel, $G_B$ channel, and B channel.

In the current embodiment, the pixels from up to bottom of the first line individually are $G_R$, B, $G_R$, B, and $G_R$. The three $G_R$ form a channel in this line, and the two Bs are another channel. The pixels from up to bottom of the second line are R, $G_B$, R, $G_B$, and R. The three Rs form a channel, and the two $G_B$ form another. Other types of the pixels can be similarly deduced. One of the objects of the present invention is to solve the variation between pixels with the equivalent channel (e.g. the same color) in the adjacent lines.

Figure 5:
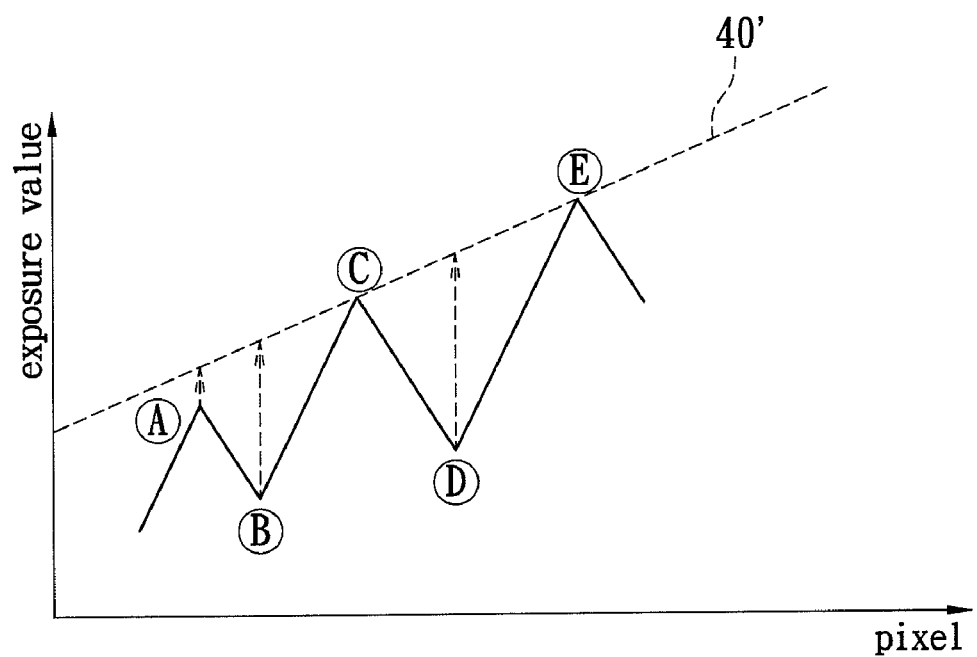
FIG. 5 shows another relationship between the pixel positions in each channel and the exposure values.

FIG. 4 and FIG. 5 respectively show the developments of the exposure values of the pixels with the equivalent channel over the image sensor. The claimed method of eliminating image noise is employed to compensate the pixels in each channel.

Reference is made to FIG. 4, the dots A, B, C, and D individually represent the exposure values of the adjacent pixels. The curves with fluctuations represent the variations still happen even the pixels work under a uniform light source. The method for eliminating the image noise is incorporated to produce the compensation values for the pixels in each channel, in order to reduce the variation between the channels. The compensation curve 40 shown in the figure indicates the target value of the compensation for each pixel. In particular, the curve 40 is depicted based on the average of every channel. In the current case, the pixels A, B, C, and D approach this compensation curve 40 after compensation. The arrowheads show the approaching actions.

Referring FIG. 4, the differences from the pixels to the compensation curve 40 probably locate on above or below the curve 40. That difference may result in utilizing an addition, subtraction operation or the relevant circuits under a serious consideration. Reference is made to FIG. 5, the mentioned compensation curve 40 may shift to the position of the curve 40' in advance. Through a modulation of gain, the compensation curve 40' can be regulated, in the meantime, only the addition operation is utilized in the compensation progress, such as the dotted-line arrowheads. Similarly, the operation can be only the subtraction operation, or the related circuits for the purpose of simplification of circuitry. When the last image signal is outputted, a tone shifting process is used to correct the signal in compliance with the actual gain.

Figure 6:
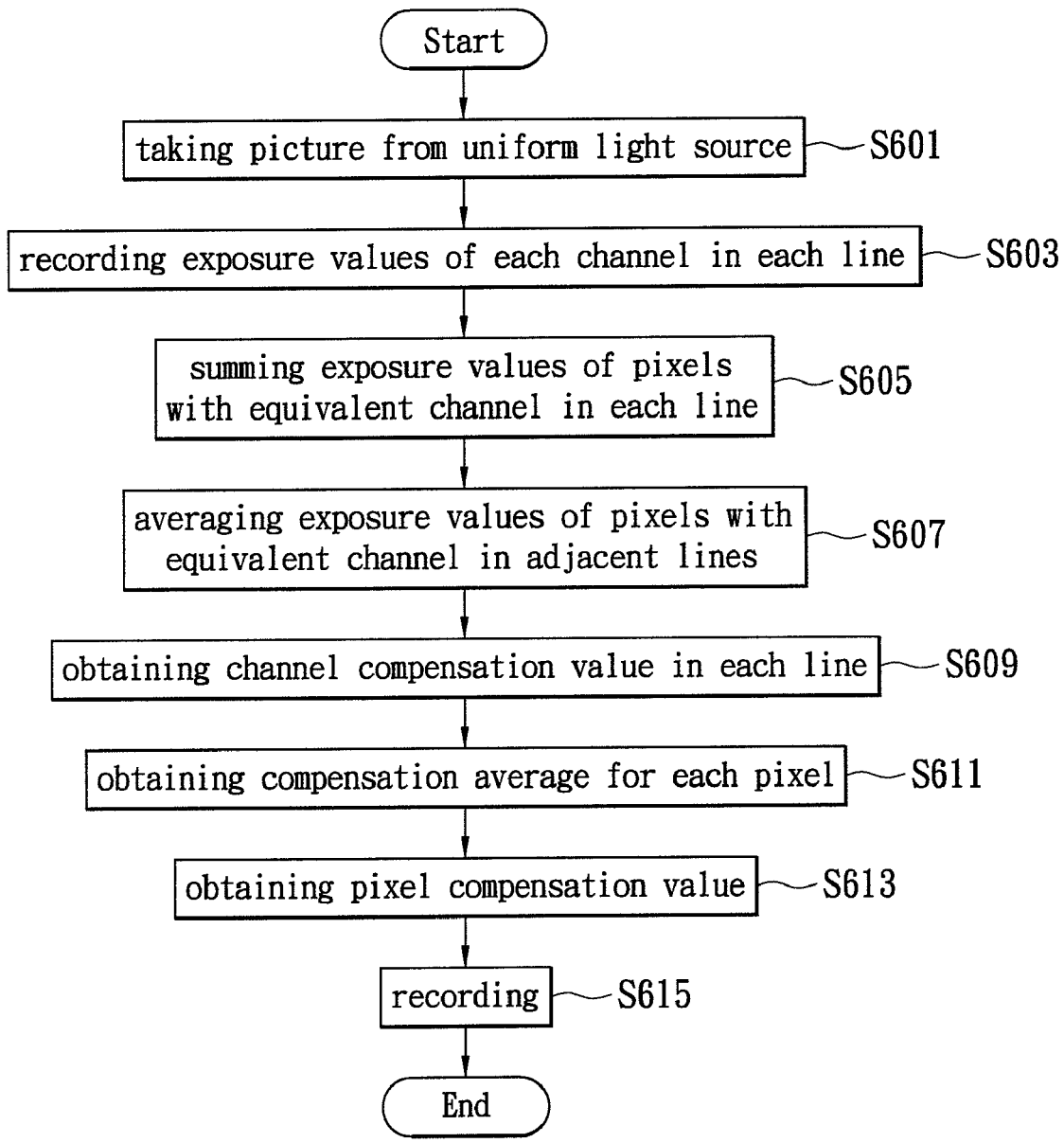
FIG. 6 illustrates a flow chart of the embodiment of the method for eliminating image noise.

The preferred embodiment of the method for elimination the image noise of the present invention is referred to the flow chart in FIG. 6.

In the beginning of steps, such as step S601, an image capturing apparatus is used to take a picture from a uniform light source, or an image with an even color. The plurality of pixels of an inside image sensor record the exposure values (step S603). Through a color filter, the every separated color R, G, B in each line of image sensor forms different channels. The exposure values are orderly recorded by pixels of each channel in each line of the image sensor.

Next in the step S605, the method is to calculate a sum of the exposure values of pixels with equivalent channel in each line. The current embodiment, reference is made to the Bayer pattern in FIG. 3, shows at least two different channels existed in one line. The channels may be R channel, $G_R$ channel, $G_B$ channel and B channel.

After the step of calculating the sum of the exposure values of pixels with equivalent channel, an average is obtained by averaging the sum and another sum of the exposure values of pixels with equivalent channel in several adjacent lines (step S607). This average is used to be the average of exposure values of pixels in the channel of each line other than the conventional way which is to calculate the average over whole image sensor.

In the preferred embodiment, the average is being calculated from the one channel in a line and the channels in a portion of the adjacent lines. For example, an average is calculated from the channel in one line and the equivalent channels of four adjacent lines. Since the picture is taken from a uniform light source, the pixels in the several adjacent lines should have approximate signals with exposure values. This is enough to be the basis of the compensation.

The mentioned average of exposure values is the target for the channels to be compensated. In step S609, the exposure value average of each channel in each line can be used to obtain a channel compensation value for each channel in a line. In an exemplary simple operation, a difference between the average of exposure values and the sum of the values of each channel in a line is to be the compensation value for each channel. In step S611, the value of the channel compensation value divided by the pixel number with equivalent channel is the compensation average for each pixel. This compensation average is the target value of the compensation for each pixel.

Figure 7:
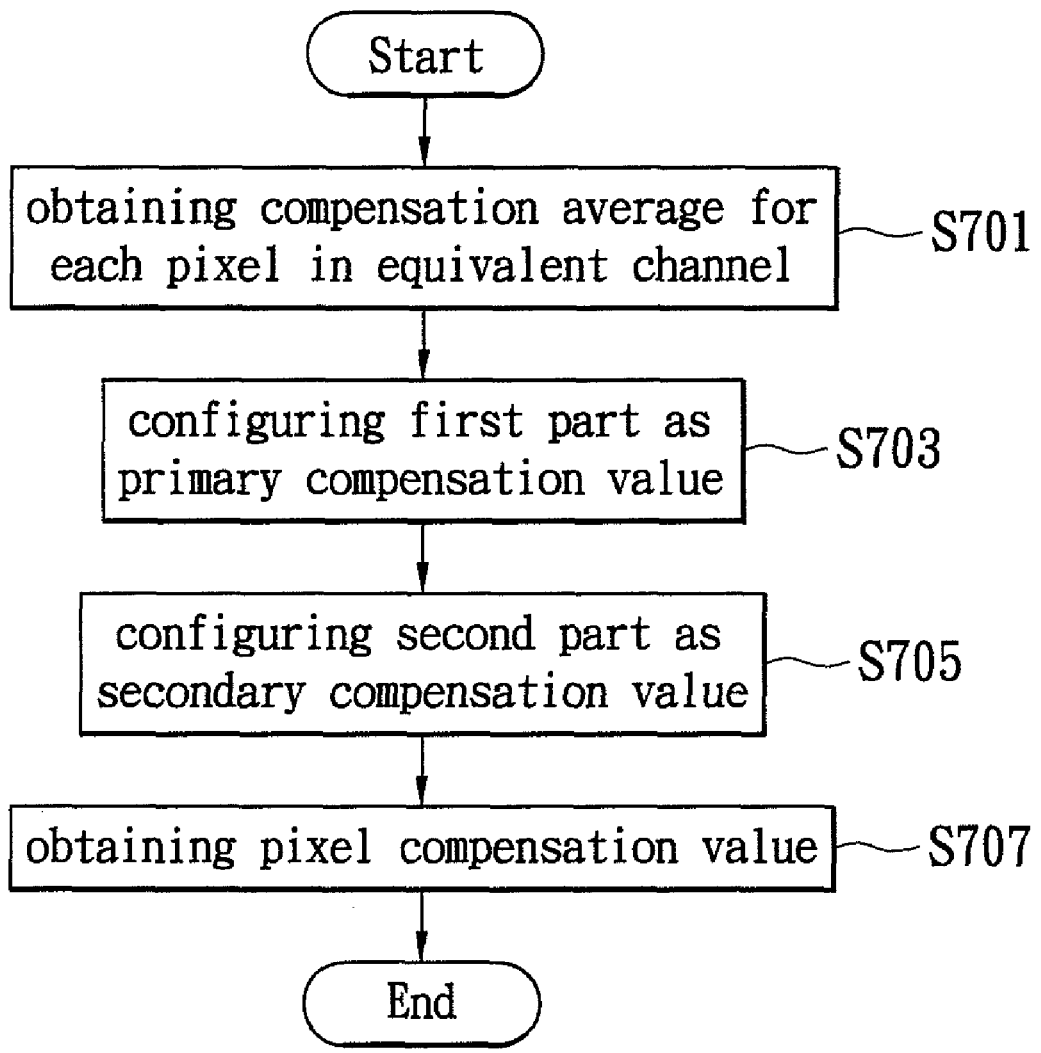
FIG. 7 shows a flow chart in a further embodiment of the method for eliminating image noise.

Preferably in one embodiment, the compensation average is divided into a first part (the integer part) and a second part (the decimal part). The pixel compensation value is obtained in step S613 by integrating the integer part and the decimal part. The detail description can be referred to FIG. 7. The obtained pixel compensation value is then recorded into a compensation memory unit (step S615), and used for the basis of reference for compensating the exposure value for each pixel as photographing. The approach is particularly to eliminate image noise.

In order to solve the frequency difference between the channels in a line, the compensation average shown in step S611 of FIG. 6 is employed. The different compensating energies are adding to different pixel in order to break the fixed signal frequency between lines. The detail is shown in the flow chart of FIG. 7.

Following the step S611 of FIG. 6, the step S701 depicts the average obtained from the channels in each line and the equivalent channels in the several adjacent lines. This average is then divided by the pixel number of the pixels with equivalent channel for obtaining a compensation average. This compensation average is the target value of the compensation for each pixel. The compensation average preferably has an integer part and a decimal part. The integer part is regarded as a first part of the average, and the decimal part is as a second part. Rather than the conventional art that has no way to deal with the decimal part as a part of compensation, the present invention embodies both integer and decimal parts. The mentioned first part in this compensation average of the present invention is configured as a primary compensation value (step S703). The primary compensation value is used for all the pixels in a single channel. Further, the second part is applied to a portion of the pixels, and configured as a secondary compensation value (step S705). After integrating (or summing up) the primary compensation value and the secondary compensation value, the pixel compensation values for every pixel are rendered (step S707).

More particularly, the mechanism incorporating the average related to partial pixels and allotment of compensation value is used to be basis of the pixel compensation value, in order to eliminate the image noise. For example, the pixels with equivalent channel are randomly selected rather than selecting whole pixels, and imposed with the secondary compensation value. The approach to randomly selected pixels is beneficial to break the fixed signal frequency between lines.

In another embodiment, the secondary compensation value can also be used upon the pixels which are evenly selected.

Figure 8:
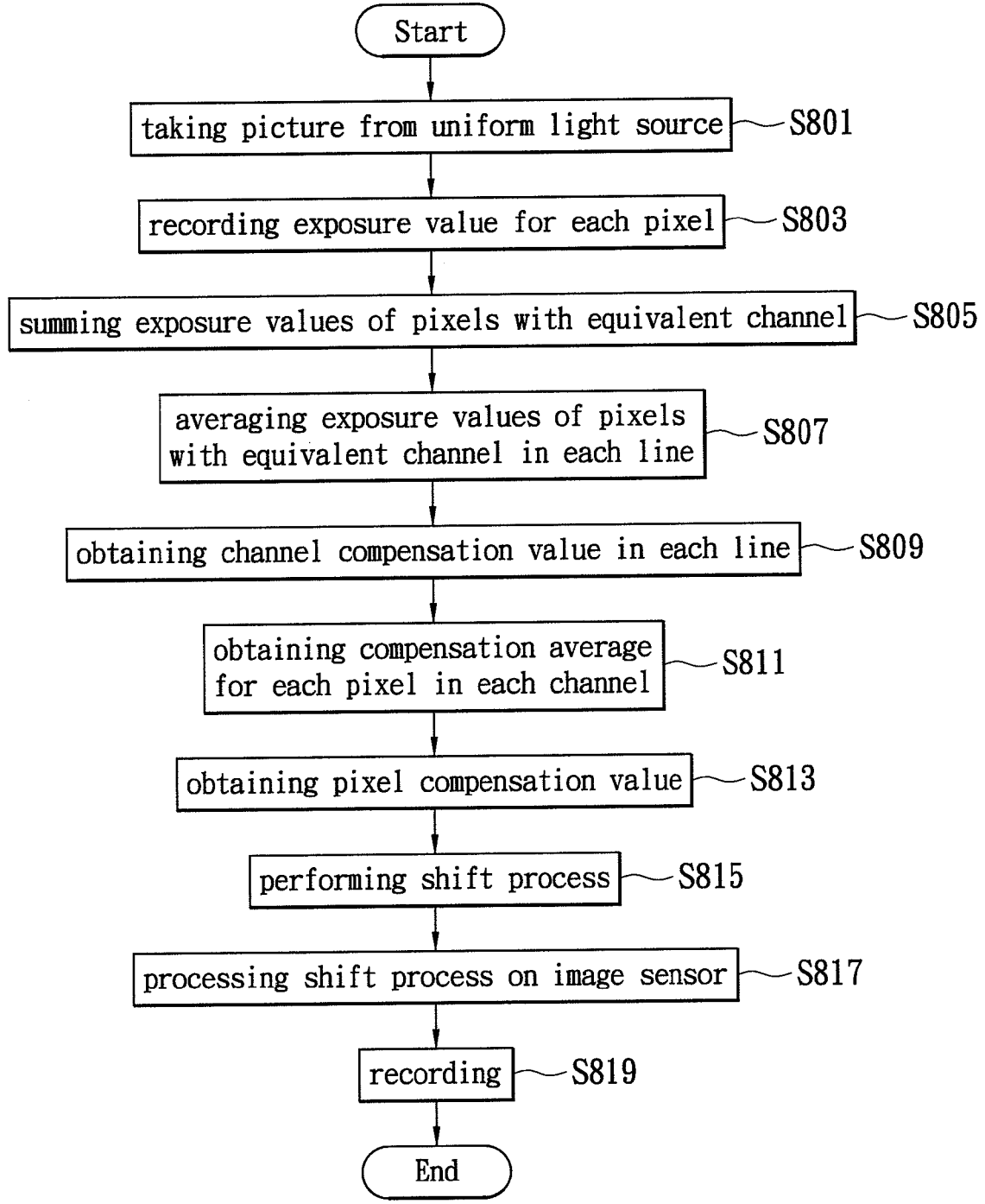
FIG. 8 is a flow chart illustrating the next embodiment of the method for eliminating image noise.

FIG. 8 is a flow chart illustrating the next embodiment of the method for eliminating image noise. The flow chart illustrates that the hardware design can be simplified through the mentioned shift process after obtaining the pixel compensation value for each pixel.

In the beginning, such as step S801, an image capturing apparatus takes a picture from a uniform light source. In which the pixels with equivalent channel are categorized as one channel. Pixels on an image sensor inside the apparatus orderly record the exposure values for the pixels by channel and by line (step S803). A sum of the exposure values for each channel in one line is calculated. A color filter inside is used to separate the pixels on the image sensor into red, green having $G_R$ and $G_B$, and blue channels. Therefore, one line may include the pixels with different channels. The step in the method is then to calculate a sum of exposure values of the pixels with equivalent channel in one line (step S805).

After that, the step S807 in the method is to calculate an exposure value average for each channel in each line by averaging the above sum of pixels with equivalent channel and the sum of exposure values of pixels with equivalent channel in several adjacent lines. It is featured that the preferred embodiment of the present invention is to calculate the average from the partial adjacent lines rather than the whole pixels on the image sensor. More significantly, the pixels located in the adjacent lines have the similar correlation which can be the basis for further correction. Further, that also can simplify the hardware design.

The above-described exposure value average can be the target value of the compensation for each pixel. Next, the difference between the average of the exposure values and the sum of the exposure values in the equivalent channel of each line is used to obtain the channel compensation value for each channel (step S809). Further, this channel compensation value is used to calculate the compensation average for each pixel. The compensation average is obtained by dividing the channel compensation value by the pixel number in each channel in one line. The compensation average, therefore, is the target value of the compensation for each pixel (step S811). Specially, this compensation average is usually not an integer. Instead, there are two parts existed in this number, such as a first part and a second part preferably separated from the compensation average.

The first part of compensation average can be a primary compensation value for every pixel. The first part is preferably the integer part. The second part is obtained from a portion of pixels by allotting the pixel compensation value, and be a secondary compensation value. In one embodiment, the pixel compensation value is rendered by summing up the primary compensation value and the secondary compensation value (step S813). It is noted that the primary compensation value is the compensation value for all pixels, but the part of the pixels have no need of the secondary compensation value. In some situations, the secondary compensation value can be zero.

In an exemplary example, the compensation value for every channel is set as 23 divided by the pixel number 10, and the compensation average equals to 2.3. It shows that the exposure values of whole pixels in the equivalent channel should add the value 2.3 originally, but the value 2 is firstly handled in consideration of the hardware design and benefits. +2 is the primary compensation value. After that, three (3) pixels are randomly or evenly selected, and their secondary compensation value are individually +1. It is noted that the compensation value for these three pixels is +3, and for the other seven pixels is +2 if the number of total pixels is 10. Therefore, the pixel compensation value for 10 pixels can be listed as:

+2, +3, +2, +2, +3, +2, +2, +3, +2, +2

In a further example, if the channel compensation value is −25, the compensation average of the 10 pixels is −2.5 and the pixel compensation value for the pixels can be listed as a sequence as follows:

−2, −3, −2, −3, −2, −3, −2, −3, −2, −3 wherein 5 pixels thereof are −3 since the decimal part is 5.

Therefore, since the primary compensation value for every pixel is integer, the hardware design can be simplified.

Moreover, since the channel compensation value can be plus or minus value, both adding and subtraction operations may be used to operate the computation as processing compensation. In order to simplify the operation and hardware design, a shift process of the present invention is particularly introduced (step S815). The shift process is to shift the target value of the compensation for each pixel or each channel, and to make all the compensation operations to be an adding or a subtraction operation for benefiting calculation. Reference is made to FIG. 5.

The color tones of image under the shift process will be changed since the adding operation in the shift process will raise the brightness of image, and the subtraction operation makes reduction. Therefore, the brightness should be oppositely corrected after compensation, that is, it is to process another shift process on the image sensor. The image under the shift process in step S815 is corrected in order to be restored to the original brightness (step S817). Consequently, the pixel compensation values for, the image sensor are recorded, especially into a memory of the image capturing apparatus for being the compensation basis of future photographing (step S819).

Figure 9:
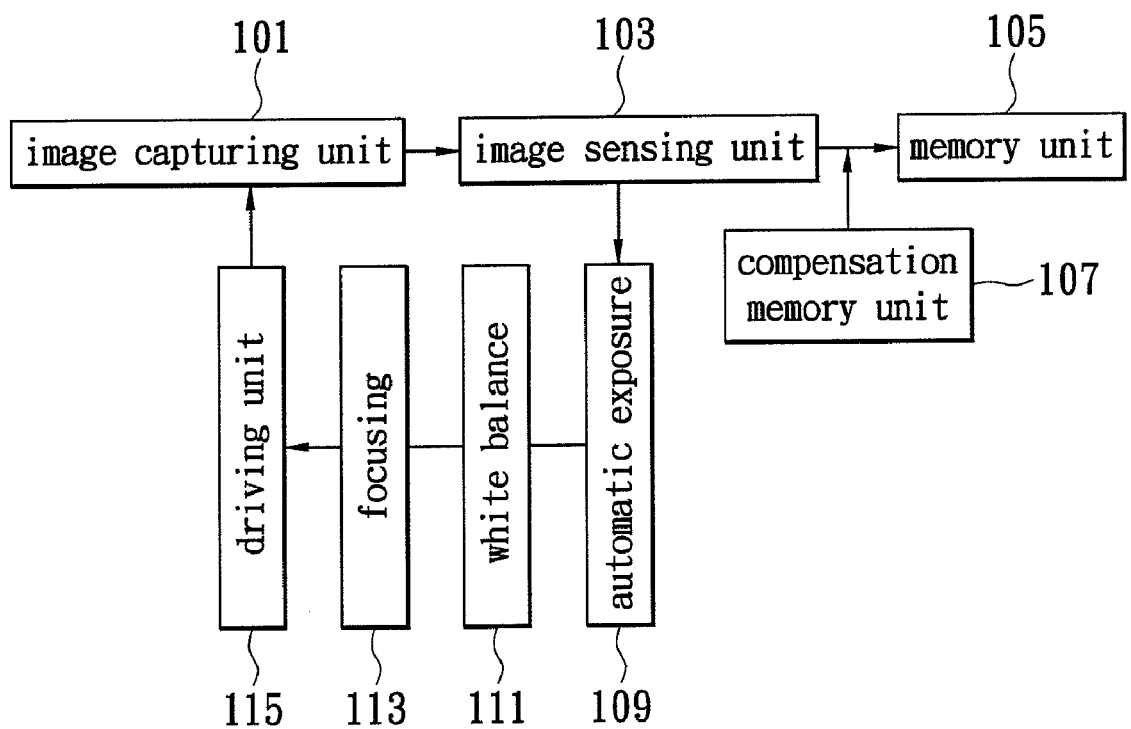
FIG. 9 shows a schematic diagram of the apparatus used to eliminate the image noise according to an embodiment of the present invention.

FIG. 9 shows a schematic diagram of the apparatus used to eliminate the image noise according to an embodiment of the present invention. The main part of the figure shows an ordinary image capturing apparatus which includes an image capturing unit 101 for capturing images, an image sensing unit 103 for sensing and converting the images into digital signals. A memory unit 105 is further provided for storing the signals. Other essential parts of the apparatus provide the functions of automatic exposure (109), white balance (111), focusing (113), and a driving unit 115 for controlling the lenses of the image capturing unit 101.

Particularly, the compensation value for each pixel of the image sensor is obtained by the claimed method. The image noise can be eliminated by the compensation process. Since the pixel compensation is made especially for a specific image sensor, different device, circuit and the product under different manufacturing procedure may have different situations. The compensation values will be recorded into a memory, such as compensation memory unit 107, of a particular device. Those compensation values are particularly to be the reference basis of compensation as photographing. The compensation memory unit 107, in another embodiment, can be a portion of the original memory unit 105.

Figure 10:
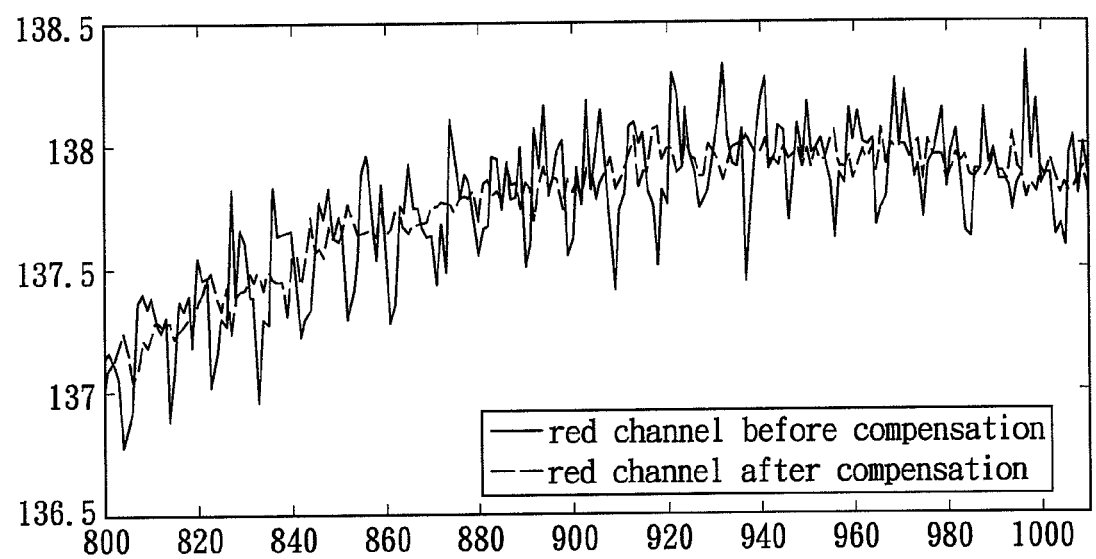
FIG. 10 depicts the experimental data of the method of the present invention.

The relevant experimental data of the method of the present invention can be referred to FIG. 10.

In an exemplary example, the channels can be separated through a reference of Bayer pattern. The experimental data of a red channel before or after the provided compensation is shown in the figure. In which a uniform light source is provided, such as a lamp box Lv10. A color separation of the taken picture is made according to the Bayer pattern. The horizontal axis indicates the channels in every line of the image sensor and shows the number more than 1000 lines in the image sensor. The vertical axis indicates the exposure values of the channels after taking a picture from a uniform light source.

The solid line in the figure shows the fluctuation caused by the fixed image noise which affects the intensity of pixels before compensation. More, the dotted line shows the situation after compensation, in which the fixed image noise is eliminated as the fluctuation is effectively reduced according to the experiment.

In the summation of above description, disclosed are the method for eliminating the image noise and the apparatus using the same. One of the objects thereof is to solve the image noise caused by the variation between the pixels of the image sensor. An average of the exposures values in each channel and in the adjacent channels is firstly calculated. A channel compensation value and the compensation average for pixels are then obtained. A pixel compensation value for each pixel is obtained by allotting the compensation average, and to be the basis for compensation as photographing.

The above-mentioned descriptions represent merely the preferred embodiment of the present invention, without any intention to limit the scope of the present invention thereto. Various equivalent changes, alternations or modifications based on the claims of present invention are all consequently viewed as being embraced by the scope of the present invention.

What is claimed is:

1. A method for eliminating image noise, comprising:
   taking an image of a uniform light source;
   sequentially recording exposure values by pixels of an image sensor;
   calculating a sum of the exposure values of each channel in each line, wherein the channel is one selected from an R channel, a $G_R$ channel, a $G_B$ channel, and a B channel;
   calculating an average of the sum of exposure values of each channel and another sum of the exposure values of several adjacent channels in each line;
   obtaining a channel compensation value for each channel in each line from a difference between the average and the sum of exposure values of pixels of each channel in each line;
   obtaining a compensation average for each pixel with equivalent channel in each line by dividing the channel compensation value by a pixel number of each channel in each line, wherein the compensation average has a first part and a second part;
   obtaining a pixel compensation value for each pixel by allotting the first part and the second part of the compensation average;
   performing a shift process which shifts a target value of the compensation for each pixel for benefiting calculation;
   performing a tone shift for the image sensor for calibrating color aberration after the shift process; and
   recording the pixel compensation value for each pixel for compensating the exposure value as photographing.

2. The method of claim 1, wherein the shift process calibrates all the pixel compensation values as a plus or a minus.

3. The method of claim 1, further comprising a color filter that used for separating an R channel, a $G_R$ channel, a $G_B$ channel, and a B channel from each line in the image sensor.

4. The method of claim 1, wherein the first part of the compensation average for each pixel is a primary compensation value for all the pixels with equivalent channel in each line, and the second part of the compensation average is a secondary compensation value for partial pixels with equivalent channel.

5. The method of claim 4, wherein the partial pixels having the secondary compensation value are randomly selected.

6. The method of claim 4, wherein the partial pixels having the secondary compensation value are evenly selected.

7. The method of claim 1, wherein sum of the primary compensation value and the secondary compensation value is the pixel compensation value for each pixel.

8. The method of claim 1, wherein the first part is an integer, and the second part is a decimal.

9. The method of claim 1, wherein the obtained pixel compensation value is recorded in a compensation memory unit for compensating the exposure value as photographing.

10. An apparatus using the method for eliminating image noise as claimed in claim 1, wherein the apparatus is used to photographing an image and recording the image signals, and the apparatus at least includes an image capturing unit, an image sensing unit, and a memory unit, characterized in that the apparatus comprises:

a compensation memory unit recording the pixel compensation values obtained in claim 1, wherein the pixel compensation values are used to compensate the photographed image.

\* \* \* \* \*